(12) United States Patent
Okamoto (10) Patent No.: US 11,159,682 B2
(45) Date of Patent: Oct. 26, 2021

(54) IMAGE FORMING APPARATUS AND IMAGE FORMATION METHOD

(71) Applicant: KYOCERA Document Solutions Inc., Osaka (JP)

(72) Inventor: Hironori Okamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/024,179

(22) Filed: Sep. 17, 2020

(65) Prior Publication Data
US 2021/0092240 A1 Mar. 25, 2021

(30) Foreign Application Priority Data

Sep. 25, 2019 (JP) .............................. JP2019-174061

(51) Int. Cl.
| | |
|---|---|
| H04N 1/00 | (2006.01) |
| H04N 1/23 | (2006.01) |
| H04N 1/32 | (2006.01) |
| H04N 1/44 | (2006.01) |
| G06K 15/02 | (2006.01) |
| G06F 3/12 | (2006.01) |

(52) U.S. Cl.
CPC ..... *H04N 1/00244* (2013.01); *H04N 1/00344* (2013.01); *H04N 1/00408* (2013.01); *H04N 1/00477* (2013.01); *H04N 1/2369* (2013.01); *H04N 1/32026* (2013.01); *H04N 1/32101* (2013.01); *H04N 1/32496* (2013.01); *H04N 1/4426* (2013.01); *H04N 2201/0091* (2013.01); *H04N 2201/0093* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2004/0141201 | A1* | 7/2004 | Shima | H04L 43/0817 358/1.15 |
| 2005/0232266 | A1* | 10/2005 | Tanimoto | H04L 61/1511 370/389 |
| 2005/0267989 | A1* | 12/2005 | Yamamoto | G06K 15/00 709/245 |

(Continued)

FOREIGN PATENT DOCUMENTS

WO 2016-158393 A1 10/2016

*Primary Examiner* — Beniyam Menberu
(74) *Attorney, Agent, or Firm* — Studebaker & Brackett PC (57) ABSTRACT

An image forming apparatus includes a communication interface, a controller, and an image forming section. The communication interface acquires an Internet Protocol (IP) address through a Dynamic Host Configuration Protocol (DHCP) server function of a network. The controller causes the image forming apparatus to operate in a first mode based on acquisition of the IP address, and causes the image forming apparatus to operate in a second mode until the IP address is acquired. The image forming section forms an image on an image formation medium in a plurality of modes including a network mode in which the image is formed based on an image formation job acquired through the network. In the second operation mode, operation of the image forming section in the network mode is limited.

4 Claims, 6 Drawing Sheets

(56) References Cited

U.S. PATENT DOCUMENTS

| | | | | |
|---|---|---|---|---|
| 2006/0192994 A1* | 8/2006 | Tanimoto | ............... | H04L 69/40 |
| | | | | 358/1.15 |
| 2006/0198390 A1* | 9/2006 | Shouno | ............... | H04L 61/2535 |
| | | | | 370/466 |
| 2008/0008191 A1* | 1/2008 | Eguchi | ............... | H04L 61/2015 |
| | | | | 370/397 |
| 2009/0300176 A1* | 12/2009 | Shizuno | ............... | G06F 13/00 |
| | | | | 709/224 |
| 2010/0208301 A1* | 8/2010 | Zenju | ............... | H04L 41/0806 |
| | | | | 358/1.15 |
| 2011/0075206 A1* | 3/2011 | Ando | ............... | H04L 61/103 |
| | | | | 358/1.15 |
| 2018/0041469 A1* | 2/2018 | Ishikawa | ............ | H04L 41/0686 |

* cited by examiner

Warm-up screen

FIG. 5A

Display of remaining number of printable sheets

FIG. 5B

Display when receiving fax

FIG. 6

IMAGE FORMING APPARATUS AND IMAGE FORMATION METHOD

INCORPORATION BY REFERENCE

The present application claims priority under 35 U.S.C. § 119 to Japanese Patent Application No. 2019-174061, filed on Sep. 25, 2019. The contents of this application are incorporated herein by reference in their entirety.

BACKGROUND

The present disclosure relates to an image forming apparatus which is connectable to a network.

In recent years, an increasing number of image forming apparatuses (printers, multifunction printers, and multifunction peripherals (MFP), for example) which connect to a support server through the Internet have practical configurations in which maintenance services such as billing, supply of consumables, and fault diagnostics are supplied under the control of the support server. A prerequisite for such maintenance is that an image forming apparatus periodically sends self-diagnostic information to the server. In view of this, use of the image forming apparatus is limited in a case where usage status such as printed page count information cannot be sent for an unanticipated reason such as a communication failure due to operation in an area with a poor communication environment or an unexpected condition. Specifically, unless the image forming apparatus can receive a usage status reply indicating usage permission from a control device (corresponding to the support server), a user becomes unable to use the image forming apparatus because the usage of the image forming apparatus is limited after a prescribed grace period.

SUMMARY

An image forming apparatus according to an aspect of the present disclosure is communicative with a support server through a network that has a Dynamic Host Configuration Protocol (DHCP) server function. The image forming apparatus includes an image reading section, a communication interface, a controller, and an image forming section. The image reading section generates image data by reading an image from a document. The communication interface acquires an Internet Protocol (IP) address through the DHCP server function of the network and establishes communication with the support server using the IP address. The controller causes the image forming apparatus to operate in a first operation mode based on acquisition of the IP address, and causes the image forming apparatus to operate in a second operation mode in which usable functions are more limited than in the first operation mode until the IP address is acquired. The image forming section forms an image on an image formation medium in a plurality of modes including a copy mode in which the image is formed based on the image data and a network mode in which the image is formed based on an image formation job acquired through the network. In the second operation mode, operation of the image forming section in the network mode is limited.

An image formation method according to an aspect of the present disclosure is for use in an image forming apparatus which is communicative with a support server through a network that has a DHCP server function. The image formation method includes: generating image data by reading an image from a document; acquiring an IP address through the DHCP function of the network and establishing communication with the support server using the IP address; causing the image forming apparatus to operate in a first operation mode based on acquisition of the IP address, and causing the image forming apparatus to operate in a second operation mode in which usable functions are more limited than in the first operation mode until the IP address is acquired; and forming an image on an image formation medium in a plurality of modes including a copy mode in which the image is formed based on the image data and a network mode in which the image is formed based on an image formation job acquired through the network. In the second operation mode, operation of the image forming apparatus in the network mode is limited.

DETAILED DESCRIPTION

The following describes an embodiment of the present disclosure with reference to the accompanying drawings.

Figure 1:
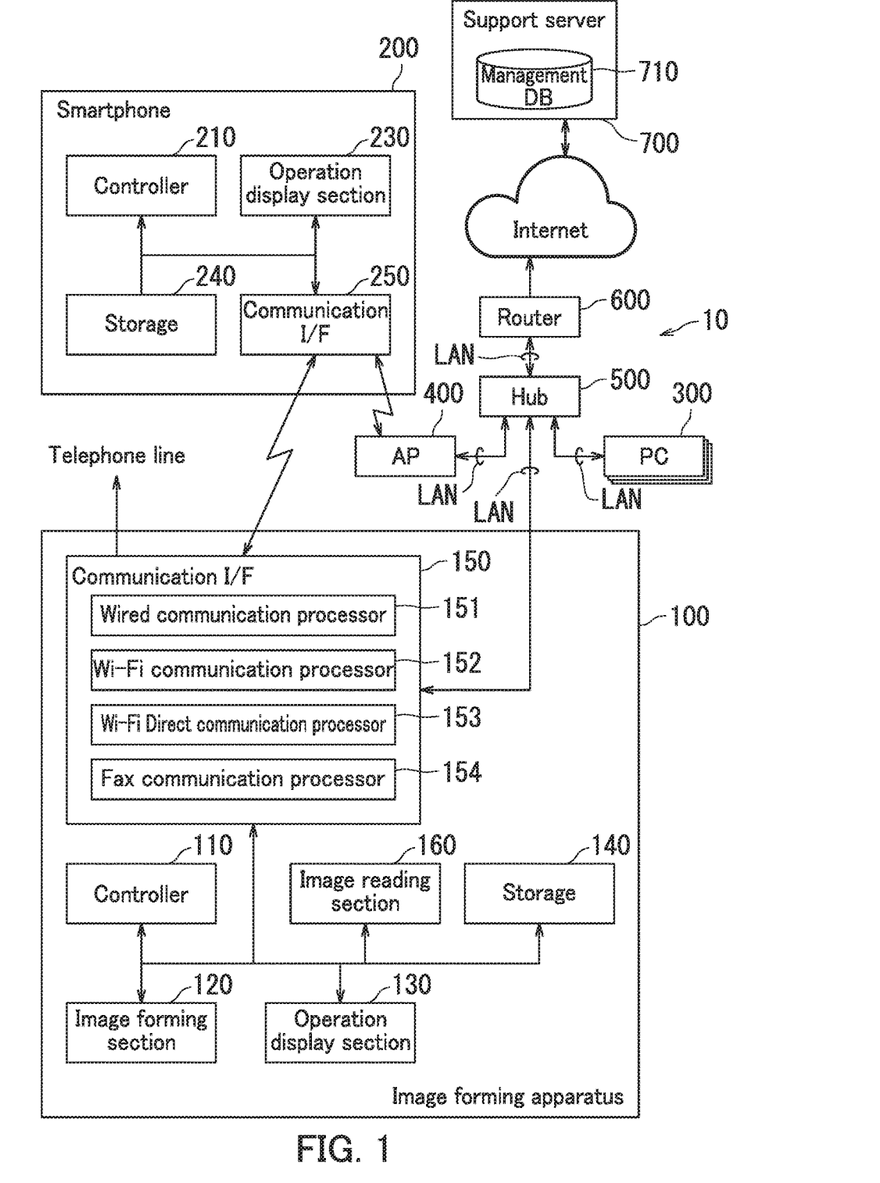
FIG. 1 is a block diagram illustrating a functional configuration of an image forming system according to an embodiment of the present disclosure.

FIG. 1 is a block diagram illustrating a functional configuration of an image forming system 10 according to the embodiment of the present disclosure. The image forming system 10 includes an image forming apparatus 100, a smartphone 200, and a plurality of personal computers (also simply referred to as PCs) 300. In the present embodiment, the image forming apparatus 100 is a multifunction peripheral (MFP). The image forming system 10 is connected to a support server 700 through a hub 500 and a router 600 which constitute a local area network (LAN, also simply referred to as a network), and the Internet. In this example, the hub 500 is assumed to be a repeater hub which directly relays a signal to all nodes.

The support server 700 stores a management database (also referred to as a management DB) 710 and controls a large number of image forming apparatuses used by a large number of users. The management database 710 stores items such as billing information for printed page counts and other matters, supply management information for consumables, and diagnostic data for providing maintenance service such as fault diagnostics for each of the image forming apparatuses including the image forming apparatus 100. The supply management information of consumables is used to determine when to supply consumables such as toner, and enables automatic ordering of consumables.

The smartphone 200 includes a controller 210, an operation display section 230, storage 240, and a communication interface 250. The smartphone 200 is communicatively connected to the image forming apparatus 100 through an access point (also simply referred to as an AP) 400 or Wi-Fi Direct.

The image forming apparatus 100 includes a controller 110, an image forming section 120, an operation display section 130, storage 140, a communication interface (also referred to as a communication I/F) 150, and an image reading section 160. The communication interface 150 includes a wired communication processor 151, a Wi-Fi communication processor 152, a Wi-Fi Direct communication processor 153, and a fax communication processor 154. The communication interface 150 further includes a connector (unillustrated) for performing data output to a storage medium such as Universal Serial Bus (USB) memory.

The image reading section 160 generates image data by reading an image from a document. The image forming section 120 can form an image on an image formation medium in a plurality of operation modes including a copy mode and a network mode. The copy mode is an operation mode in which an image is formed based on image data generated by the image reading section 160. The network mode is an operation mode in which an image is formed based on a print job (corresponding to an image formation job) acquired through a network (LAN).

The wired communication processor 151 performs ETHERNET (registered Japanese trademark) communication through a wired network (LAN). The access point 400, the personal computers 300, and the router 600 are connected to the wired communication processor 151 through the wired network (LAN). The Wi-Fi communication processor 152 performs wireless communication with the smartphone 200 through the access point 400.

The router 600 has a DHCP server function and dynamically assigns IP addresses to the devices 100, 200, and 300 as DHCP clients connected to the network (LAN). In assigning an IP address, a validity period (lease period) is specified for the IP address and the DHCP client performs renewal before the lease period expires. The router 600 can reassign an IP address for which a lease period has expired without renewal to another DHCP client.

The Wi-Fi Direct communication processor 153 causes the image forming apparatus 100 to function as an access point and realizes direct wireless communication between the image forming apparatus 100 and the smartphone 200. The Wi-Fi Direct communication processor 153 sets the image forming apparatus 100 as a group owner and is set so as to enable a connection to the smartphone 200 using a preset static IP address. In the present embodiment, wireless LAN (IEEE 802.11) is used for the wireless communication function. The Wi-Fi Direct communication processor 153 corresponds to a direct wireless communication section.

The fax communication processor 154 is constantly capable of sending and receiving a fax through a telephone line. The image forming apparatus 100 is installed in an office or a restaurant for example and is in a power-on state (sleep state) even on non-operation days such as office holidays so as to be constantly capable of sending and receiving a fax.

The controllers 110 and 210 include a main storage means such as random-access memory (RAM) or read-only memory (ROM) and a control means such as a microprocessing unit (MPU) or a central processing unit (CPU). The controllers 110 and 210 also include controller functions related to interfacing such as various input/output (I/O), USB, other buses, and other hardware. The controllers 110 and 210 control all respective elements of the image forming apparatus 100 and the smartphone 200.

The storage 140 and 240 store data and control programs (including image formation programs) for processes respectively executed by the controllers 110 and 210 in storage devices including elements such as a hard disk drive or flash memory which are non-transitory storage media. The operation display sections 130 and 230 function as touch panels, display various menus as input screens, and receive operation input from a user.

A trusted device list and a media access control (MAC) address list are stored in the storage 140 as identification information of various devices. Service set identifiers (SSID) of the various devices which are permitted to wirelessly communicate with the image forming apparatus 100 are included in the trusted device list. The SSID of a mobile terminal (the designated smartphone 200, for example) which is usable for accessing the support server 700 is pre-registered in the trusted device list. The MAC addresses of the various devices which are permitted to wirelessly communicate with the image forming apparatus 100 are included in the MAC address list. The MAC address of the mobile terminal (the designated smartphone 200, for example) which is usable for accessing the support server 700 is pre-registered in the MAC address list.

Figure 2:
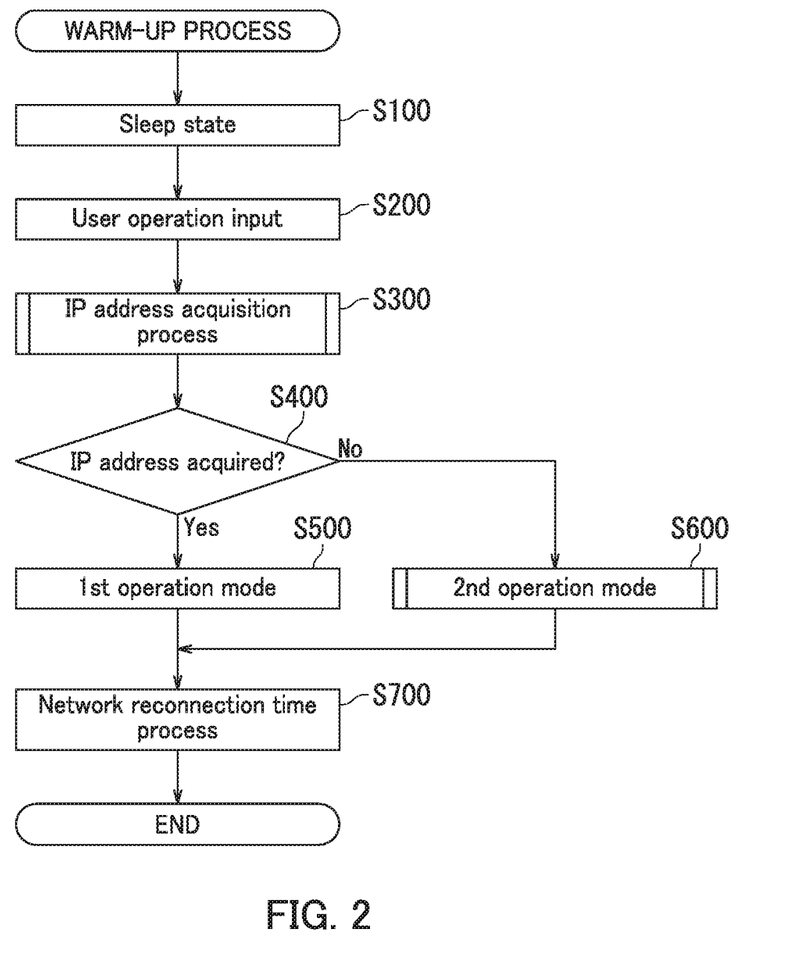
FIG. 2 is a flowchart depicting the procedure of a warm-up process.

FIG. 2 is a flowchart depicting the procedure of a warm-up process. The warm-up process is typically performed by the image forming apparatus 100 connected to the network (LAN) in which the power of the hub 500 and the router 600 is off in view of security or energy conservation.

In Step S100, the image forming apparatus 100 is in a sleep state. In the sleep state, the image forming apparatus 100 can warm up in response to receiving a fax, generate received content as an image on printing paper, and output the printing paper as printed matter.

In Step S200, the image forming apparatus 100 receives operation input from the user. Specifically, the user opens a document table cover (unillustrated) to place a document on a document table (unillustrated) of the image forming apparatus 100, for example. The image forming apparatus 100 detects the operation of the document table cover as operation input from the user and starts an IP address acquisition process (Step S300).

Figure 3:
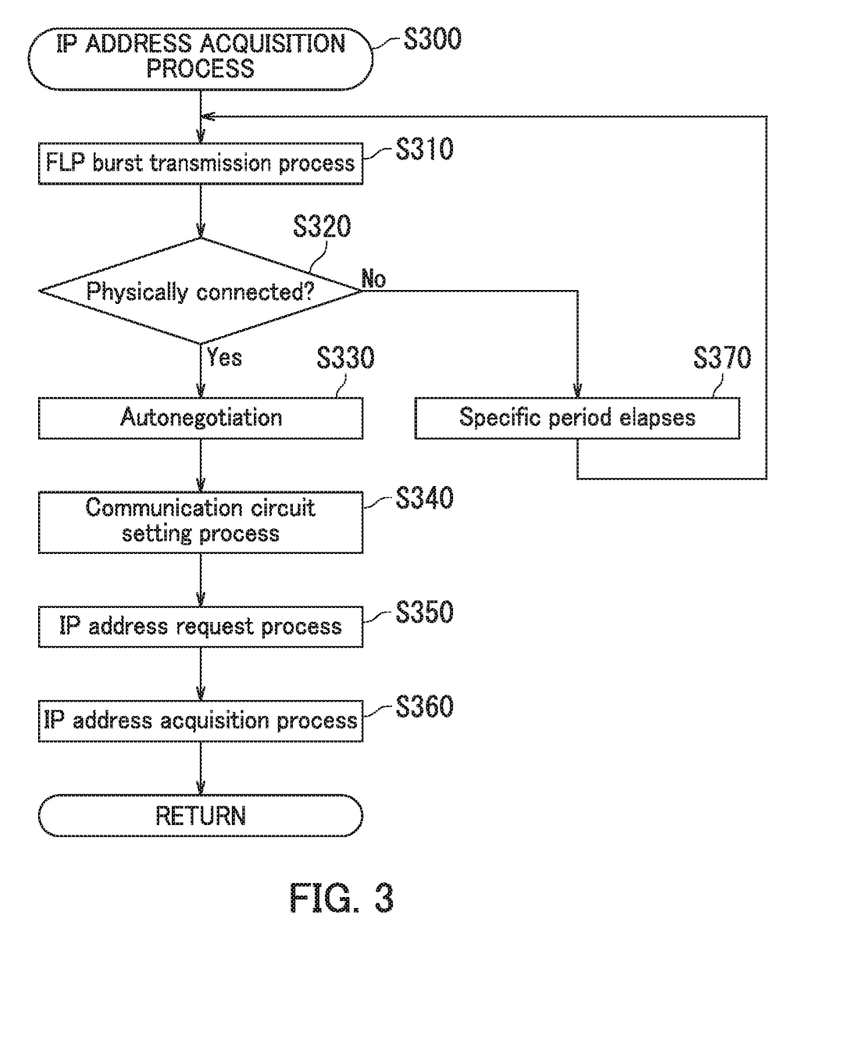
FIG. 3 is a flowchart depicting the procedure of an IP address acquisition process.

FIG. 3 is a flowchart depicting the procedure of the IP address acquisition process (Step S300). In Step S310, the wired communication processor 151 of the communication interface 150 sends a fast link pulse (FLP) burst to the entire network (LAN) through the hub 500. The FLP burst is a signal sent using the 10 MEGABIT ETHERNET (registered Japanese trademark) standard (10BASE-T).

The FLP burst consists of 33 pulses. Odd-numbered pulses are clock pulses for keeping pulse timing. Even-numbered pulses are data pulses. The data pulses represent a transmission method supported by the device sending the data pulses (the wired communication processor 151 in this case). The transmission method is a combination of a transmission speed and a transmission mode (full duplex or half duplex). Full duplex is a bidirectional communication method in which data can be sent and received in both directions simultaneously. Half duplex is a bidirectional communication method in which data can be sent and received in only one direction at a time, and sending and receiving from both directions is enabled by time division.

Specifically, in a case where the data pulses correspond to a combination of the standard and transmission mode of 10 MEGABIT ETHERNET (registered Japanese trademark) for example, the bits of pulses in numbered (even-numbered) positions corresponding to this combination are 1 (with pulse). In a case where the data pulses correspond to a combination of the standard and transmission mode of 100 MEGABIT ETHERNET (registered Japanese trademark) for example, the bits of pulses in numbered (even-numbered) positions corresponding to this combination are 1 (with pulse). In a case where the data pulses correspond to a combination of the standard and transmission mode of 1000 MEGABIT ETHERNET (registered Japanese trademark) for example, the bits of pulses in numbered (even-numbered) positions corresponding to this combination are 1 (with pulse). Therefore, the FLP burst can be transmitted to a partner device through a transmission method supported by the transmission source of the FLP burst.

In Step S320, the process advances to Step S330 when it is determined that a modular connector (RJ-45 for example, unillustrated) of the wired communication processor 151 is connected to the network (the router 600 in this example), and the process advances to Step S370 when it is determined that the wired communication processor 151 is not physically connected to the network.

The wired communication processor 151 determines that the image forming apparatus 100 is physically connected to the network when there is a reply to the FLP burst during bidirectional operation of the hub 500 and the router 600. When there is no reply to the FLP burst within a preset period while at least one of the hub 500 and the router 600 is not operating (is powered off, for example), the wired communication processor 151 determines that the image forming apparatus 100 is not physically connected to the network.

In Step S330, the wired communication processor 151 starts an autonegotiation process. In the autonegotiation process, the communication interface 150 automatically selects the highest priority method among the transmission methods supported by both of the transmission source of the FLP burst (the router 600 in this example) and the wired communication processor 151. In this example, it is assumed that 100BASE-T (full duplex) is selected as the transmission method for both devices as a result of the autonegotiation process.

In Step S340, the wired communication processor 151 performs a communication circuit setting process. In the communication circuit setting process, the wired communication processor 151 sets a communication circuit to 100BASE-T (full duplex) selected in the autonegotiation process for communication with the router 600.

In Step S350, the wired communication processor 151 performs an IP address request process. In the IP address request process, the wired communication processor 151 broadcasts a DHCPDISCOVER message within the network (LAN). The DHCPDISCOVER message is a message for searching for a DHCP server.

The router 600 with a DHCP server function functions as a DHCP server and broadcasts a DHCPOFFER message within the network (LAN) in response to the DHCPDISCOVER message. The DHCPOFFER message includes an IP address and other information (setting parameters such as a subnet mask or a domain name system (DNS)). In this example, it is assumed that the router 600 sets the lease period of the IP address to a period less than 24 hours, for example 20 hours. Therefore, the wired communication processor 151 requires the IP address to be renewed every day.

In Step S360, the wired communication processor 151 performs an IP address acquisition process. In the IP address acquisition process, the wired communication processor 151 receives and analyzes a DHCPOFFER message, sets the IP address leased by the DHCPOFFER message as the IP address of the wired communication processor 151 of the image forming apparatus 100, and performs a communication setting using other information acquired from the DHCPOFFER message. Therefore, the image forming apparatus 100 becomes capable of internet communication through the router 600 based on Transmission Control Protocol/Internet Protocol (TCP/IP).

As a result, the image forming apparatus 100 can presume that it is possible to connect to the support server 700 as needed based on the acquisition of an IP address. Conversely, the image forming apparatus 100 can presume that it is not possible to connect to the support server 700 until an IP address is acquired.

As such, the image forming apparatus 100 can determine whether or not communication with the support server 700 is possible without performing communication with the support server 700 unless there is a failure of the support server 700 or an Internet communication failure. Therefore, the image forming apparatus 100 can determine whether or not the system (the image forming system 10 and the network (LAN)) on the side of the user can communicate with the support server 700 without increasing a communication burden on the support server 700.

It should be noted that the image forming apparatus 100 sends an FLP burst each time a specific period (a number of seconds, for example) elapses when determining that the image forming apparatus 100 is not physically connected to the network (Step S370). Therefore, the image forming apparatus 100 becomes capable of communicating with the support server 700 in response to operation start of the hub 500 and the router 600 without being excessively delayed.

Returning to FIG. 2, in Step S400, the controller 110 of the image forming apparatus 100 determines whether or not an IP address has been acquired. When an IP address has been acquired, the controller 110 sets the operation mode of the image forming apparatus 100 to a first operation mode (Step S500), and the process advances to Step S600 when an IP address has not been acquired. The first operation mode is a state where, on the condition that support can be received from the support server 700 and the network (LAN) is usable, the image forming apparatus 100 can be used normally without any particular limitations. That is, the first operation mode is a state where all types of jobs can be received.

In Step S600, the controller 110 of the image forming apparatus 100 sets the operation mode of the image forming apparatus 100 to a second operation mode. The second operation mode is an operation mode for using the image forming apparatus 100 in a state where support cannot be received from the support server 700 and the network (LAN) is unusable. Usable functions are more limited in the second operation mode than in the first operation mode.

Figure 4:
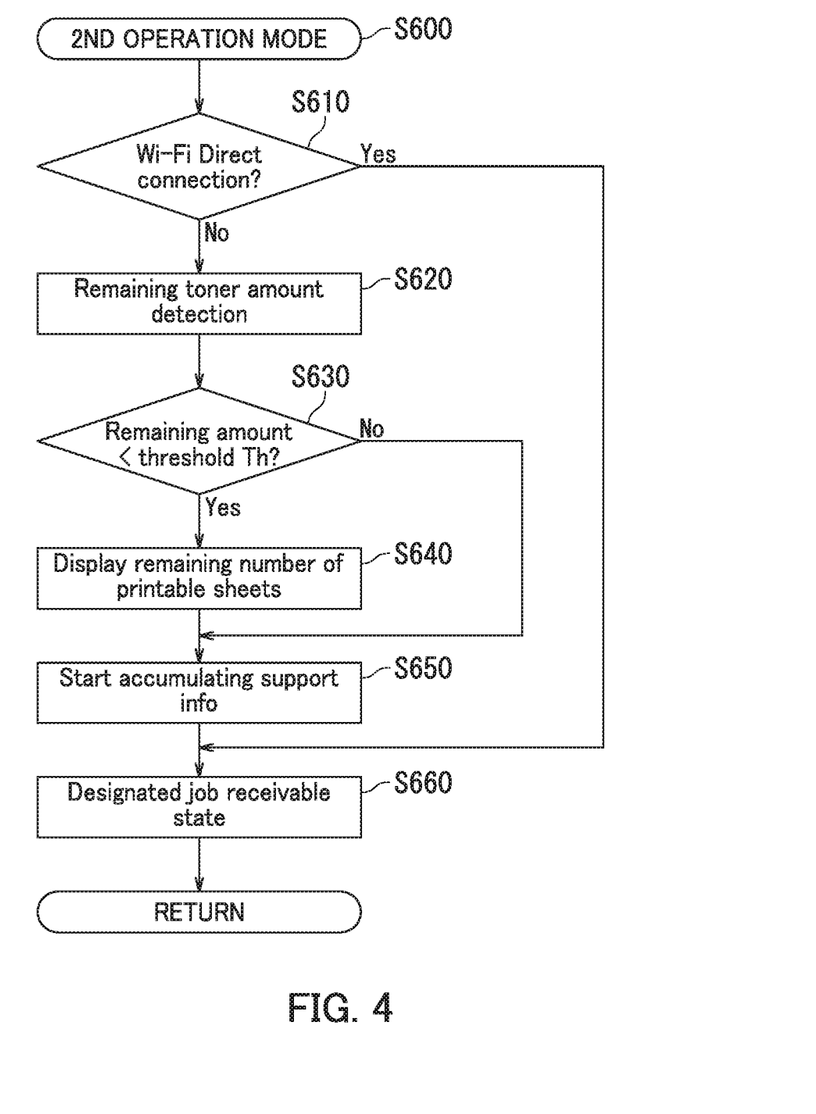
FIG. 4 is a flowchart depicting the procedure of processing in a second operation mode.

FIG. 4 is a flowchart depicting the procedure of processing in the second operation mode (Step S600). In Step S610, the controller 110 of the image forming apparatus 100 attempts to connect using Wi-Fi Direct. In this example, it is assumed that identification information of the smartphone 200 (an SSID and a MAC address, for example) are pre-registered for accessing the support server 700 in the trusted device list.

The Wi-Fi Direct communication processor 153 of the communication interface 150 broadcasts a packet referred to as a beacon. The beacon is sent in a specific period with an interval of 100 msec, for example. The beacon includes items such as the SSID of the image forming apparatus 100, the beacon transmission interval, channel (frequency) information, and a list of supported transfer speeds. Data representing information about content requested to be used for access to the support server 700 is additionally included in the beacon.

When the user has the smartphone 200 which is pre-registered, the operation display section 230 of the smartphone 200 performs a pop-up display (unillustrated) as a push notification and displays that communication using Wi-Fi Direct for accessing the support server 700 is requested in the pop-up display in response to receiving the beacon.

The Wi-Fi Direct communication processor 153 of the image forming apparatus 100 attempts to establish Wi-Fi Direct communication with the smartphone 200. In the Wi-Fi Direct communication, a preset static IP address is used as the IP address of the image forming apparatus 100. Communication using Wi-Fi Direct is an example of direct peer-to-peer (P2P) wireless communication.

The controller 110 determines whether or not the smartphone 200 is permitted to access the support server 700 based on the identification information of the smartphone 200 and accesses the support server 700 through the smartphone 200 when determining that access is permitted. Therefore, the image forming apparatus 100 becomes capable of sending support information to the support server 700 through the smartphone 200.

When the controller 110 of the image forming apparatus 100 becomes capable of accessing the support server 700 through the smartphone 200, the process of Steps S620 to S650 is skipped due to interrupt processing, and the process advances to Step S660. Until the controller 110 becomes capable of accessing the support server 700 through the smartphone 200, the process of Steps S620 to S650 is performed.

In Step S620, the controller 110 of the image forming apparatus 100 performs remaining toner amount detection. In Step S630, the controller 110 determines whether or not the remaining toner amount is less than a preset threshold Th. When the remaining toner amount is less than the threshold Th, the controller 110 displays a remaining number of printable sheets (Step S640). In this example, the threshold Th is assumed to be set to 5000 pages at A4 conversion.

When the image forming apparatus 100 has a calendar function, the setting of the threshold Th can be predetermined according to a number of continuous holidays, for example. Specifically, when assuming a weekend with two non-operation days, for example, a system administrator can set the threshold Th to 500 pages, for example. When assuming a weekend with three non-operation days, the system administrator can set the threshold Th to 700 pages, for example. When assuming nine continuous holidays, the system administrator can set the threshold Th to 2000 pages, for example.

Figure 5A:
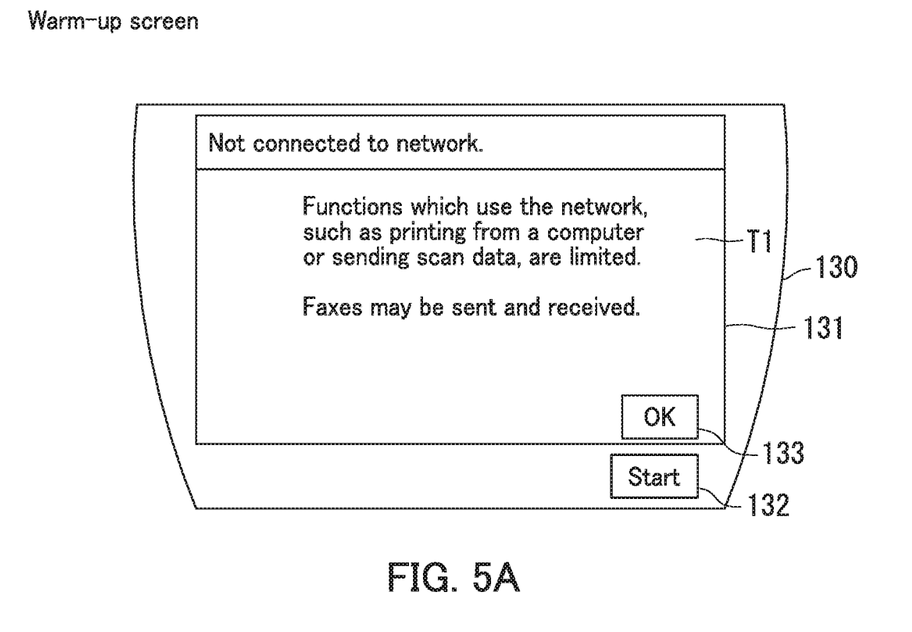
FIGS. 5A and 5B are descriptive diagrams illustrating display examples of an operation display section in the second operation mode.
Figure 5B:
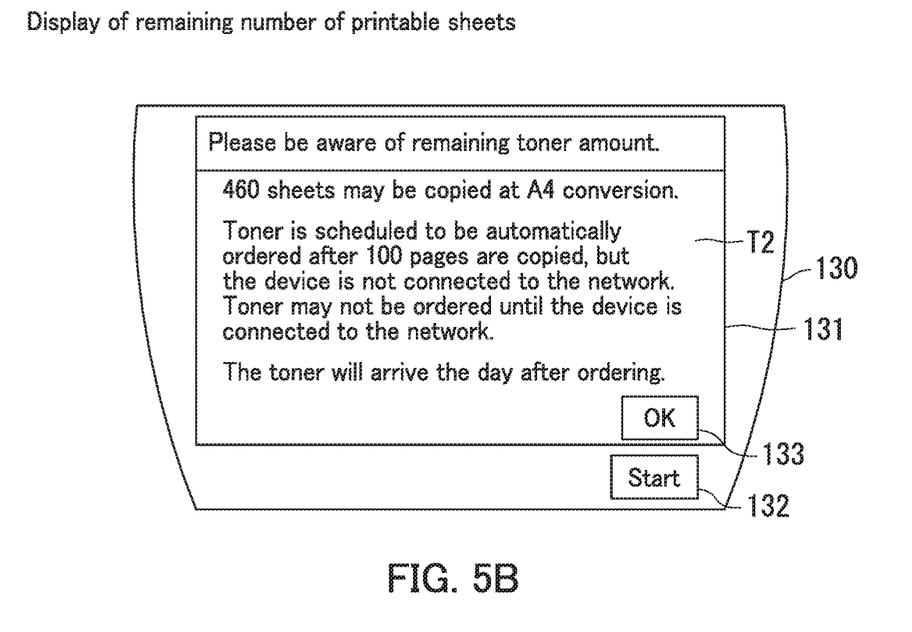

FIGS. 5A and 5B are descriptive diagrams illustrating display examples of the operation display section 130 in the second operation mode. FIG. 5A is a descriptive diagram illustrating a warm-up screen in the second operating mode. The operation display section 130 has a user interface screen 131 and a start button 132. An OK icon 133 and a text display T1 for alerting of disconnection from the network (LAN) are displayed in the user interface screen 131.

The text display T1 indicates to the user that the image forming apparatus 100 is disconnected from the network (LAN), and indicates that while functions which use the network (LAN) such as "printing from a computer" or "sending scan data" are limited, sending and receiving a fax is possible. The user can shift the display screen of the operation display section 130 to the next display screen (FIG. 5B) by touching the OK icon 133. Sending scan data is a process by which image data (PDF data, for example) generated by reading a document with the image reading section 160 is sent to a designated personal computer 300.

FIG. 5B is a descriptive diagram illustrating a remaining number of printable sheets in the second operation mode. An OK icon 133 and a text display T2 for alerting the user to a remaining toner amount are displayed in the user interface screen 131.

The text display T2 indicates to the user that the remaining toner amount is "460 pages at A4 conversion" and can entrust the user to determine whether or not to cause the image forming apparatus 100 to perform copy output. The text display T2 additionally indicates a warning that if the toner runs out and the image forming apparatus 100 is connected to the network (LAN) on an operation day (Monday, for example), toner will not arrive until the following day (Tuesday, for example). Therefore, downtime of the image forming apparatus 100 may occur.

Accordingly, in a case where there is another image forming apparatus for example, the user can also preferentially use the other image forming apparatus. Furthermore, the user can perform a 200-page copy process for example, and can thereafter cause support information to be sent with the hub 500 and the router 600, which were off in view of energy conservation, as temporarily on. Therefore, the image forming apparatus 100 can send the support information to accelerate the delivery of toner.

As such, the image forming apparatus 100 can appropriately provide the user with the transmission status of the support information. The user can accordingly take appropriate action in response to the status. Therefore, the image forming apparatus 100 can realize an improvement in convenience for the user by allowing appropriate use of the image forming apparatus 100 without excessively influencing maintenance work which uses the support server 700.

Returning to FIG. 4, in Step S650, the image forming apparatus 100 starts accumulating support information. The accumulation of support information is a process by which support information such as a page count during copy mode operation for billing use or fault diagnostic information is stored (accumulated) in the storage 140. The accumulated support information becomes newly generated support information after the latest support information has been sent to the support server 700. The support information is sent to the support server 700 directly after the image forming apparatus 100 has been connected to the network (LAN) (refer to later-described Step S700).

In Step S660, the image forming apparatus 100 enters a designated job receivable state in response to the user touching the OK icon 133. The designated job receivable state is a state where a performable job can be received without using the network (LAN). The designated job receivable state is a state where, for example, operation of the image forming section 120 is permitted in copy mode and operation is limited in a network mode.

In this example, disconnection of the image forming apparatus 100 from the network (LAN) is presupposed or scheduled, and reconnection to the network (LAN) is also scheduled. Therefore, the maintenance of the image forming apparatus 100 is not excessively negatively influenced even when the image forming apparatus 100 is used in a state where the image forming apparatus 100 is temporarily disconnected from the network (LAN).

Figure 6:
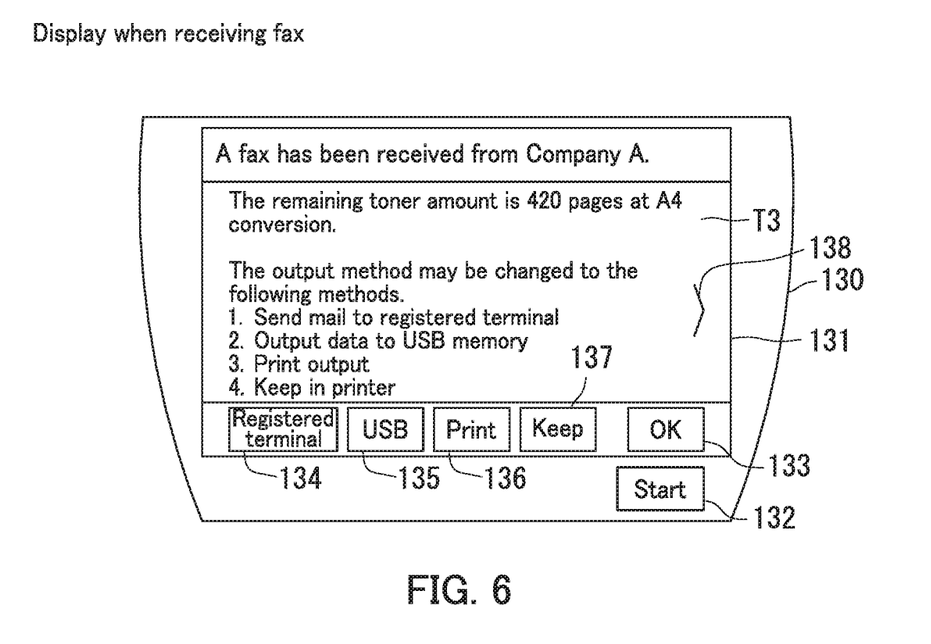
FIG. 6 is a descriptive diagram illustrating a display example of the operation display section during facsimile (fax) reception in the second operation mode.

FIG. 6 illustrates a display example of the operation display section 130 during fax reception in the second operation mode. The operation display section 130 has a user interface screen 131 and a start button 132. In addition to an OK icon 133 and a text display T3 for informing that a fax has been received from Company A, a registered terminal icon 134, a USB icon 135, a print icon 136, a keep icon 137, and a scroll icon 138 are displayed in the user interface screen 131. The scroll icon 138 is an icon for previewing content of the fax by scrolling the display of the user interface screen 131.

The text display T3 indicates to the user that the "remaining toner amount is 420 pages at A4 conversion" and can entrust the user to determine whether or not to cause the image forming apparatus 100 to perform print output of the received fax. The text display T3 additionally indicates four options as methods to respond to fax reception. Specifically, "send mail to registered terminal" in response to a touch to the registered terminal icon 134, "output data to USB memory" in response to a touch to the USB icon 135, "print output" in response to a touch to the print icon 136, and "keep in printer" in response to a touch to the keep icon 137 are usable as options.

"Send mail to registered terminal" is a process by which the received content of the fax is put in a PDF file, for example, and is sent to a pre-registered terminal directly after the image forming apparatus 100 has been connected to the network (LAN). "Output data to USB memory" is a process by which the received content of the fax is put in a PDF file, for example, and is written to a storage medium such as USB memory using a connector (unillustrated) of the communication interface 150. "Print output" is a process by which the image forming section 120 forms an image representing the received content of the fax on an image formation medium and outputs the image formation medium. "Keep in printer" is a process by which the received content of the fax is stored in the storage 140.

When the image forming apparatus 100 does not receive user input before a preset period elapses, the controller 110 automatically performs "keep in printer" and sets the display in FIG. 6 to the warm-up screen. Therefore, when the image forming apparatus 100 is warmed up, the user can know that a fax has been received and that it is possible to perform "send mail to registered terminal", "output data to USB memory", "print output", or a combination thereof. The user can realize a combination by touching and selecting the registered terminal icon 134 and the print icon 136 and then touching the OK icon 133, for example.

It should be noted that the image forming apparatus 100 automatically stores report output for printing out the management state of the image forming apparatus 100 in the storage 140 as data (text data, for example). Therefore, the image forming apparatus 100 can prevent consumption of toner. Switching to a process by which such toner consumption is prevented may be performed when the remaining toner amount is less than the preset threshold Th (or another threshold Tha), for example. It is also possible to process the report output in the same manner as the fax reception, for example.

Returning to FIG. 2, in Step S700, the image forming apparatus 100 performs a network reconnection time process in response to (that is, triggered by) connection (acquisition of an IP address) to the network (LAN) on the day after (on Monday, for example) a non-operation day, for example. In the network reconnection time process, the image forming apparatus 100 can also perform a process necessary for connecting to the network (LAN) and processes such as sending scan data or sending mail of a fax to a registered terminal while a fixing section (unillustrated) is warming up.

The image forming apparatus 100 additionally sends the support information accumulated in the storage 140 to the support server 700. In addition, the image forming apparatus 100 may send data representing content of operation performed by the image forming apparatus 100 during network disconnection time to the system administrator.

As such, the image forming apparatus 100 in the embodiment realizes a highly robust system by enabling easy operation of the image forming apparatus 100 while the image forming apparatus 100 is disconnected from the network and can ensure convenience for the user. The image forming apparatus 100 can realize smooth operation of the image forming apparatus 100 while the image forming apparatus 100 is presumably disconnected from the network (LAN) particularly during non-operation days such as holidays.

In particular, the image forming apparatus 100 in the embodiment allows usage of the image forming apparatus 100 without limitation including printing from a personal computer 300 in a case where an IP address is acquired and normal operation of the network (LAN) is confirmed, that is, a case where there is no problem in the system on the side of the user, even when a failure occurs on the side of the support server 700 or the Internet. Therefore, the image forming apparatus 100 can realize highly robust user-friendly operation in a case where usage is allowed under control of the support server 700, even when a large-scale disaster occurs.

The present disclosure is not limited to the above embodiment and can also be implemented in the following variations.

Variation 1: In the above embodiment, a remaining number of printable sheets is displayed when an IP address cannot be acquired, but a remaining number of printable sheets may also be displayed when there is no response from the support server 700. In this case, the user can realize operation (printing from a personal computer 300, for example) of the image forming apparatus 100 using the network (LAN) while acquiring information related to a possibility that the supply of a consumable is delayed due to a failure of the support server 700 or a communication failure.

Variation 2: In the above embodiment, the supply of toner is displayed to the user as an example of maintenance work, but maintenance work may also include fault detection, for example. Specifically, in a case where an abnormality detection function of the controller 110, for example, detects an abnormality in the image forming apparatus 100, it is assumed that whether the image forming apparatus 100 should be left alone for a while to observe progress or immediate repair is needed to prevent a serious fault cannot be determined without using the support server 700.

In this case, the image forming apparatus 100 may be configured to display on the operation display section 130 a message calling for the user to ensure connection to the support server 700. According to the present disclosure as described above, it is only necessary when communication with the support server 700 cannot be established to display on the operation display section 130 that maintenance work (including automatic ordering of toner or printing paper, for example) using the support server 700 may be limited and influence (downtime caused by toner outage or the like, for example) that the limitation to maintenance work has on the operation of the image forming apparatus 100.

Variation 3: In the above embodiment, the router 600 has a DHCP server function, but a server with a DHCP server function may be included in the network (LAN). The network (LAN) with a DHCP server function need only be a network with a node that has a DHCP server function.

Variation 4: In the above embodiment, the smartphone 200 is used as a mobile terminal, but a tablet computer or a notebook PC may also be used as a mobile terminal, for example.

What is claimed is:

1. An image forming apparatus which is communicative with a support server through a network that has a Dynamic Host Configuration Protocol (DHCP) server function, the image forming apparatus comprising:

an image reading section configured to generate image data by reading an image from a document;

a communication interface configured to acquire an Internet Protocol (IP) address through the DHCP server function of the network and establish communication with the support server using the IP address;

a controller configured to cause the image forming apparatus to operate in a first operation mode based on acquisition of the IP address, and cause the image forming apparatus to operate in a second operation mode in which usable functions are more limited than in the first operation mode until the IP address is acquired; and an image forming section configured to form an image on an image formation medium in a plurality of modes including a copy mode in which the image is formed based on the image data and a network mode in which the image is formed based on an image formation job acquired through the network, wherein the communication interface sends a beacon including identification information of the image forming apparatus, a pre-registered mobile terminal receives the beacon, and the communication interface establishes direct wireless communication with the mobile terminal in response to a request from the mobile terminal, the controller determines whether or not the mobile terminal is permitted to access the support server based on the identification information of the mobile terminal, and accesses the support server through the mobile terminal to send support information of the image forming apparatus to the support server in response to permission from the support server when it is determined that the mobile terminal is permitted, and in the second operation mode, operation of the image forming section in the network mode is limited.

2. The image forming apparatus according to claim 1, wherein the controller causes display of a remaining number of printable sheets until access to the support server through the mobile terminal becomes possible.

3. The image forming apparatus according to claim 1, wherein the controller accumulates the support information in the image forming apparatus until access to the support server through the mobile terminal becomes possible.

4. An image formation method for use in an image forming apparatus which is communicative with a support server through a network that has a DHCP server function, the image formation method comprising:

generating image data by reading an image from a document;

acquiring an IP address through the DHCP function of the network and establishing communication with the support server using the IP address;

causing the image forming apparatus to operate in a first operation mode based on acquisition of the IP address, and causing the image forming apparatus to operate in a second operation mode in which usable functions are more limited than in the first operation mode until the IP address is acquired;

forming an image on an image formation medium in a plurality of modes including a copy mode in which the image is formed based on the image data and a network mode in which the image is formed based on an image formation job acquired through the network;

sending a beacon including identification information of the image forming apparatus;

receiving the beacon by a pre-registered mobile terminal;

establishing direct wireless communication with the mobile terminal in response to a request from the mobile terminal;

determining whether or not the mobile terminal is permitted to access the support server based on the identification information of the mobile terminal, and accessing, when it is determined that the mobile terminal is permitted, the support server through the mobile terminal to send support information of the image forming apparatus to the support server in response to permission from the support server, wherein in the second operation mode, operation of the image forming apparatus in the network mode is limited.

* * * * *